June 13, 1933.   J. J. O'SULLIVAN   1,913,852
BALANCED ABRASIVE WHEEL
Filed May 12, 1928
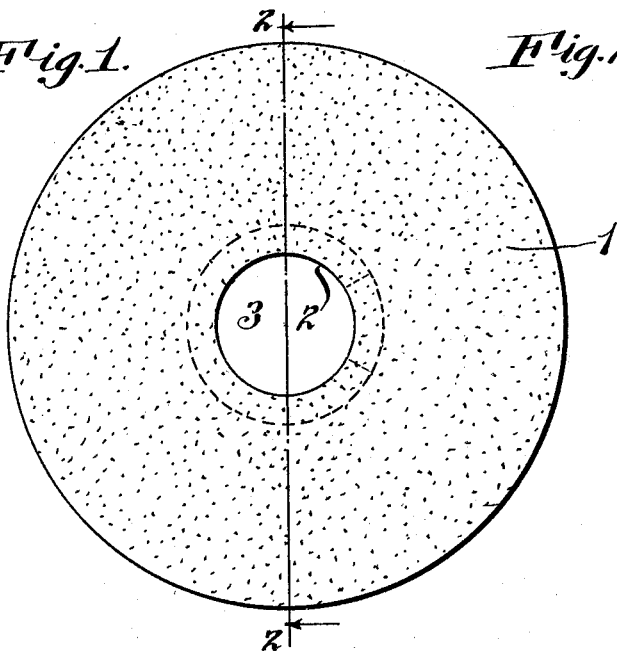
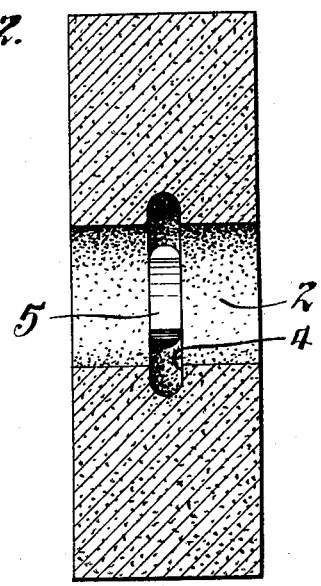
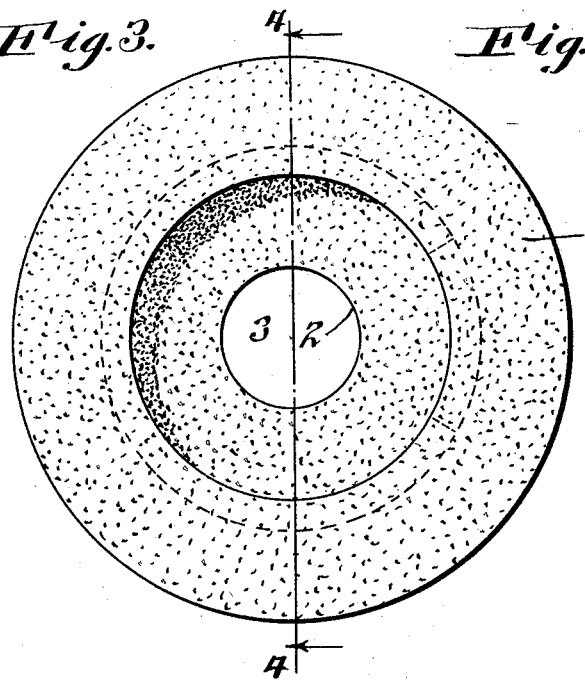
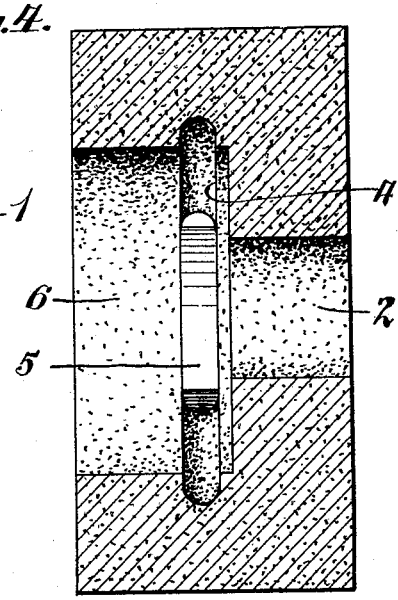
Inventor
John J. O'Sullivan
By Popp and Powers
Attorney Patented June 13, 1933

1,913,852

UNITED STATES PATENT OFFICE

JOHN J. O'SULLIVAN, OF NIAGARA FALLS, NEW YORK, ASSIGNOR OF ONE-HALF TO JOHN P. CONWAY, OF BUFFALO, NEW YORK

BALANCED ABRASIVE WHEEL

Application filed May 12, 1928. Serial No. 277,242.

This invention relates to abrasive grinding wheels and more particularly to the combination with the wheel of an element for balancing the wheel either during the course of manufacture or rebalancing it after the wheel has become worn.

In the abrasive grinding wheel art, it is necessary that the center of mass of the wheel substantially coincide with the center of rotation; in other words that the wheel be balanced. When this condition does not exist undue stresses are set up in the wheel and also in the mounting, the latter stresses being transmitted back to the wheel, and, as such wheels are comparatively weak, the stresses set up may cause it to break or explode. The unbalanced condition also causes the mounting and wheel to vibrate with an intensity proportional to the moment of inertia of the unbalanced mass. This vibration increases the wear on the bearings and causes the wheel to cut unevenly, in other words dig into the work, thereby unduly increasing the stress on the wheel and furthering the danger of destruction.

Heretofore various methods have been proposed to correct the unbalanced condition of the wheel. The most successful method and the only one in general use at the present time consists in determining in the usual way the amount of weight required and then drilling or chipping a hole in the light side of the wheel and filling it with molten lead. The drilling or chipping must be done with great care as it is very liable to result in the formation of cracks, generally invisible, but which develop into dangerous flaws when the wheel is operated. Furthermore even when the hole is carefully made, it is frequently too small or too large and thereby expensive corrections are necessitated. As this type of correction is more or less permanent, it may become useless after a period of operation in which the wheel is worn down and, in some cases, it even becomes a detriment.

A further objection to this method is that it requires the use of melted lead, the pouring of which consumes considerable time and necessarily involves a waste of material as well as finishing operations to remove any lead which falls on the surface of the wheel or protrudes from the hole in which it is placed.

The principal object of the present invention is, therefore, to provide a simple and relatively inexpensive construction which will overcome all of the objections above referred to, which will permit the wheel to be balanced or rebalanced in a comparatively short time and which does away with all guess work in relation to the space provided for the balancing material or the quantity of balancing material utilized.

A further object is to provide a construction wherein the balancing material can be concealed from view, and the use of balancing flanges eliminated.

The invention consists generally in a grinding wheel pre-formed with an annular groove concentric to its axis and a balancing material composed of a malleable substance such as lead which is fitted or lightly hammered in the groove at a predetermined point to equalize the over-balance.

An embodiment of the invention is shown in the accompanying drawing, wherein,

Figure 1 is a side elevation of the wheel as it appears when balanced.

Figure 2 is a section along line 2—2 of Figure 1.

Figure 3 is a side elevation of a slightly modified construction.

Figure 4 is a sectional view along line 4—4 of Figure 3.

This invention may be employed in connection with any suitable type of solid or segmental abrasive wheel as 1, the wheel shown having an inner peripheral surface 2 which delimits the arbor hole 3.

The groove for receiving the balancing material is preferably formed on the inner peripheral surface 2 as indicated at 4 but it may be formed on any other inner surface which is offset from the surface 2 or it may be formed in that portion of the side faces of the wheel which is covered by the side flanges ordinarily provided.

The formation of the groove may be accomplished in any suitable manner as by molding or pressing it in the wheel but it is preferably turned in the wheel by a suitable tool. While the general shape of the groove is not essentially material, it is preferably so shaped as to permit the weight to be readily placed in the groove and, when placed, to have full engagement with the surface particles of the groove. The groove is preferably so formed that no part of it is of greater width than the top of the groove, in other words it should not be undercut. While an undercut groove can be used, it is objectionable because of the difficulty of removably securing the balancing material in the groove. The undercutting of the grove is also objectionable inasmuch as it is not only difficult to produce in an abrasive material but is very liable to cause minute cracks in the wheel body with consequent destructive effect and, due to the fragility of the abrasive material, renders it subject to chipping at the edges of the groove. The groove is preferably annular and centrally located. This, however, is merely preferred as it obviously may be located at one side of the center or a pair of grooves may be formed, one on either side of the center as will be readily understood.

The amount of balancing material 5 required to balance the wheel may be determined in any suitable manner. For example, static balance is obtained by mounting the wheel on a shaft so that it may be rotated about the proposed center of rotation, and if the center of mass does not coincide with the center of rotation, the action of gravity will cause the center of mass to take a position vertically below the center of rotation; in other words the heavy side will move to the lowest position. Known weights are then temporarily attached to the side diametrically opposite the heavy side until the wheel will rest in any position indifferently. The product of the known weights so added and the measured distance of these weights from the center of rotation constitute the correcting moment required. From this value and the known distance from the center of rotation to the center of the groove the correct balancing weight to be added may be readily computed.

This balancing weight 5 is preferably composed of a soft or malleable material such as lead or one of its alloys. The weight is preferably, but not necessarily, made in the form of a strip shaped to fit into the groove, and having a known weight per linear inch. The desired length is then cut from the strip and fitted into the groove at the proper point. If the groove is formed on an inner peripheral surface, it may be secured in the groove by gluing but is preferably secured by hammering it sufficiently to cause the rough particles of abrasive material on the surface of the groove to grip the weight with sufficient force to prevent its falling from place or moving circumferentially along the groove when otherwise unsupported.

If the groove is formed on a side face it is secured in place in the same manner and there held by any suitable means as, for instance, the side flanges ordinarily provided. The use of lead as a balancing weight is preferred because it can be bought or readily made in strips of such form as will fit the grooves utilized, because it may be readily secured in the groove by a comparatively light pressure and because it will not react with the material of the wheel.

After a wheel has been worn down to an extent sufficient to throw it out of balance, it can be easily and quickly rebalanced by removing the balancing weight and again statically balancing the wheel. Due to the manner of securing the weight to the wheel, its removal is rendered comparatively easy. When the location and amount of correcting weight is determined, it can either be easily purchased in the proper form, shaped to the form desired or obtained by using the piece removed if the latter is equal to or greater than the weight required.

In the modification, I have illustrated a wheel in which the surface formed with the groove is offset from the arbor hole as indicated at 6, the construction being otherwise similar.

Having described my invention, I claim:

1. In combination, a grinding wheel comprising an overbalanced abrasive body provided with an internal annular groove and in open communication with the arbor hole therein and an overbalance compensating element composed of a malleable substance secured in said groove at a predetermined point to equalize the overbalance, the securement being effected only by the engagement of the rough surface particles of the groove with the element.

2. In combination, a grinding wheel comprising an overbalanced abrasive body provided with an annular groove having parallel sides and located centrally between the sides of said wheel and in open communication with the arbor hole therein and an overbalance compensating element composed of a malleable substance secured in said groove at a predetermined point to equalize the overbalance, the securement being effected only by lateral distortion of said element whereby it engages the rough surface particles of the sides of said groove to frictionally retain said element in said groove.

3. In combination, a grinding wheel comprising an overbalanced abrasive body provided with a central arbor opening and with an annular groove communicating throughout its extent with said opening, and an overbalanced compensating element composed of a malleable substance secured in said groove at a predetermined point to equalize the overbalance, the securement being effected by adhesion of the element to the direct surface of the groove and by virtue of the character of said surface and the malleable character of the element.

In testimony whereof I hereby affix my signature.

JOHN J. O'SULLIVAN.